United States Patent
Gough et al.

(10) Patent No.: US 9,696,785 B2
(45) Date of Patent: Jul. 4, 2017

(54) ELECTRONIC DEVICE HAVING A CONTROLLER TO ENTER A LOW POWER MODE

(71) Applicant: INTEL CORPORATION, Santa Clara, CA (US)

(72) Inventors: Robert E. Gough, Sherwood, OR (US); Mazen G. Gedeon, Hillsboro, OR (US); Barnes Cooper, Tigard, OR (US); Basavaraj B. Astekar, Hillsboro, OR (US); Sean C. Dardis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 14/142,791

(22) Filed: Dec. 28, 2013

(65) Prior Publication Data
US 2015/0185808 A1    Jul. 2, 2015

(51) Int. Cl.
*G06F 1/32* (2006.01)

(52) U.S. Cl.
CPC .......... *G06F 1/3234* (2013.01); *G06F 1/3231* (2013.01); *G06F 1/3293* (2013.01); *Y02B 60/121* (2013.01); *Y02B 60/1289* (2013.01); *Y02B 60/32* (2013.01)

(58) Field of Classification Search
CPC ..... G06F 1/32; G06F 1/26; G06F 1/28; G06F 1/00
USPC ....... 713/300, 310, 320, 321, 322, 323, 324, 713/330, 340, 375
See application file for complete search history.

(56) References Cited

U.S. PATENT DOCUMENTS

| | | | |
|---|---|---|---|
| 6,601,178 B1 * | 7/2003 | Gulick | G06F 13/385 713/300 |
| 2004/0059956 A1 | 3/2004 | Chakravarthy et al. | |
| 2005/0160196 A1 * | 7/2005 | Dutton | G06K 7/0013 710/10 |
| 2007/0156942 A1 | 7/2007 | Gough | |
| 2009/0119527 A1 | 5/2009 | Kim | |
| 2010/0042859 A1 | 2/2010 | Chien | |
| 2010/0169685 A1 | 7/2010 | Gough et al. | |
| 2010/0330927 A1 * | 12/2010 | Cherukuri | G06F 1/3287 455/68 |
| 2011/0078473 A1 | 3/2011 | Kwa et al. | |
| 2011/0138220 A1 | 6/2011 | Gough | |
| 2011/0276816 A1 | 11/2011 | Cooper et al. | |
| 2011/0302626 A1 | 12/2011 | Kwa et al. | |

(Continued)

FOREIGN PATENT DOCUMENTS

WO    WO 2004-075034    9/2004

OTHER PUBLICATIONS

International Search Report and Written Opinion for PCT/US2014/067618 dated Mar. 6, 2015.

*Primary Examiner* — Jaweed A Abbaszadeh
*Assistant Examiner* — Keshab Pandey
(74) *Attorney, Agent, or Firm* — KED & Associates LLP

(57) ABSTRACT

An electronic device may be provided that includes a first controller, a second controller, and a bus to connect between the first controller and the second controller. The electronic device may also include a first signal line between the first controller and the second controller, and the first controller to provide a first signal on the first signal line to the second controller to wake up the second controller from a low power mode.

24 Claims, 5 Drawing Sheets

(56) References Cited

U.S. PATENT DOCUMENTS

| | | |
|---|---|---|
| 2012/0191990 A1 | 7/2012 | Hodge et al. |
| 2012/0246505 A1* | 9/2012 | Ma .......................... G06F 1/00 713/324 |
| 2013/0007483 A1 | 1/2013 | Diefenbaugh et al. |
| 2013/0113710 A1 | 5/2013 | Choi et al. |
| 2013/0151569 A1 | 6/2013 | Therien et al. |
| 2015/0006922 A1* | 1/2015 | Huang .................. G06F 1/3206 713/310 |

* cited by examiner

ELECTRONIC DEVICE HAVING A CONTROLLER TO ENTER A LOW POWER MODE

BACKGROUND

1. Field

Embodiments may relate to communicating with an embedded controller (EC).

2. Background

An electronic device may operate in different states (or modes) such as a normal state and a sleep state. The use of different states (or modes) may be to conserve battery power.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
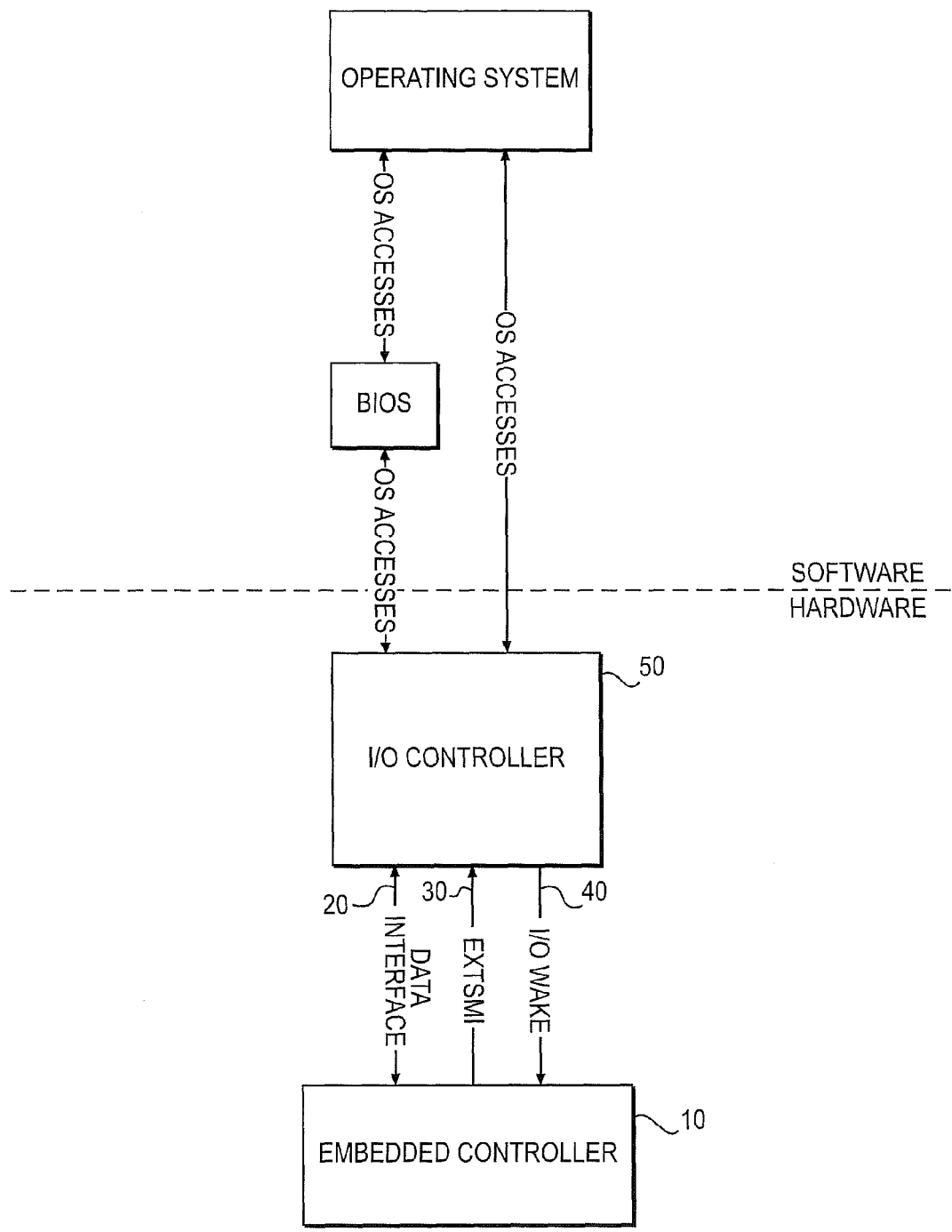
FIG. 1 is a diagram of components of an electronic device according to an example embodiment.

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

An electronic device may operate in many different modes. One operating mode is a User Absent Mode (UAM). The user absent mode is a mode in which a system (or device) is up and running, but user interfaces (e.g. displays, input devices) are not in use. The user absent mode may be used rather than a sleep mode or a standby mode.

In order to support a user absent mode, an electronic device may need to stay in a user absent mode for a particular length of time, and still be usable. However, this may decrease power from a battery over time. This may mean that an electronic device may consume less than a prescribed amount over this time. The user absent mode may also be called a low power mode (LPM).

The electronic device may be any one of a mobile terminal, a mobile device, a mobile computing platform, a mobile platform, a laptop computer, a tablet, an ultra-mobile personal computer, a mobile Internet device, a smartphone, a personal digital assistant, a display device, a television (TV), etc.

The electronic device may include many components, such as a memory, a display, a processor (or central processing unit (CPU)), a wireless communication device, a battery (in a battery port), etc. Components may be provided on circuit boards and/or on silicon chips, for example.

The electronic device may include an embedded controller (EC), connected to a core chipset through a data bus (or data interface). In at least one embodiment, the data bus may include a low-pin-count (LPC) bus. The EC may implement a keyboard system controller (KSC) and a system management controller, for example.

As one example of the keyboard system controller, when in the user absent mode (UAM), the keyboard system controller may not be processing keystrokes, since it is assumed that the user is not present. Keystrokes may still be used as a UAM exit event—meaning that a wake event may be sent to the OS, causing it to bring the device/system out of the user absent mode (UAM); but content of the keystroke may be lost (i.e., you may get a wake event, but the KSC may not know which key was hit, and therefore doesn't send the key to the OS). For example, if a user has a word processor application open before the machine entered user absent mode (UAM), and the user hits the "f" key, the word processor application may not get notified of the key, and an "f" may not appear on the screen or in the open document.

In an arrangement, the EC may save a significant amount of power by turning off an input/output (I/O) channel of a data interface (such as an LPC interface). However, it may take a significant amount of time for the EC to turn the data interface (or the LPC interface) back on. This time may be too long for a currently available operating systems. The data interface driver (or the EC interface driver) may only wait a maximum set time for the EC to become ready. Once the data interface (or the LPC interface) is turned off, a host controller may communicate with the EC to inform the EC to exit the low power mode using out-of-band mechanisms.

Embodiments may manage the EC low power mode to allow power savings. This may be done, in at least one embodiment, without changes to existing operating system code.

Embodiments may employ an out-of-band or sideband handshake between EC firmware and Basic Input/Output System (BIOS), using one or more general purpose I/O (GPIO) signal lines or other mechanisms. In at least one embodiment using two unidirectional GPIOs, a first signal (or first signal line) may be output from the BIOS-controlled chipset (i.e., an input/output hub (IOC)) to cause the EC to wake up from the I/O interface low power mode. A second signal (or second signal line) may be driven low and high by the EC as the EC enters or exits the low power mode. The BIOS may detect an operating system (OS) access to the EC, and the BIOS may wake the EC up while deferring the OS requests until the LPC interface is up and functional.

Embodiments may include at least three (3) main components, namely BIOS software, EC firmware, and/or additional board logic. For example, logic on the chipset may support a system management interrupt (SMI) trap where an OS access to the EC may be interrupted and handled by the BIOS SMI handler. Additionally, at least one embodiment may include software components at the OS layer, at kernel and/or user levels.

FIG. 1 is a diagram of components of an electronic device according to an example embodiment. Other embodiments and configurations may also be provided.

More specifically, FIG. 1 shows hardware components and software components of an electronic device. For example, the hardware may include an embedded controller 10 and an input/output (I/O) controller 50. Other components may also be provided.

The embedded controller 10 may include a data bus 20 (such as a low pin count (LPC) bus) (or other I/O interface) between the embedded controller 10 and the I/O controller 50. As one example, the data bus 20 may include 9 signal lines between the EC 10 and the I/O controller 50. Other numbers of signal lines may also be provided.

An embodiment may include a signal line 30 to couple between a pin of the EC 10 and a pin of the I/O controller 50. The signal line 30 may communicate a signal from the EC 10 to the I/O controller 50. As one example, the signal line 30 may communicate an EXTSMI signal, which may be an external system management interrupt (SMI) signal, which is an SMI coming from an external source.

An embodiment may include a signal line 40 to couple between a pin of the I/O controller 50 and a pin of the EC 10. The signal line 40 may communicate a signal from the I/O controller 50 to the EC 10. As one example, the signal line 40 may communicate a I/O Wake signal to be used to wake up the EC from the user absent mode.

As one example, the EC 10 may include a keyboard system controller (KSC), a system management controller (SMC), a data interface (or an LPC interface) and an EXTSMI handler. Other components may be provided as components of the EC 10.

The KSC may communicate with a matrix keyboard (i.e., an embedded keyboard in a laptop/clamshell style system) and a pointing device such as a touchpad, exposed to the host as a PS/2-style keyboard/mouse.

The SMC may deal with managing other functions within the device/system, including thermal management (thermal sensors, fan control) battery management (charging, reporting), power sequencing for turning on/off the device/system or individual components.

FIG. 1 also shows software components of the electronic device. The software components may include BIOS and an operating system (OS). The software components may be provided in a memory, such as on a chip. The BIOS is a path between the OS and the I/O controller 50.

The OS may communicate with the EC through the I/O controller 50. BIOS may communicate with the OS using a mechanism in the I/O controller and the processor (such as a central processing unit (CPU)) to act as a proxy for the EC and by providing tables in memory during a power-on self test (POST) to be consumed by the OS. The I/O controller 50 may communicate with the OS by responding to OS Accesses (data or I/O read and write transactions), and the I/O controller 50 may communicate with the BIOS by responding to OS Accesses (data or I/O read and write transactions). The OS may include a driver to access the EC 10.

Figure 2:
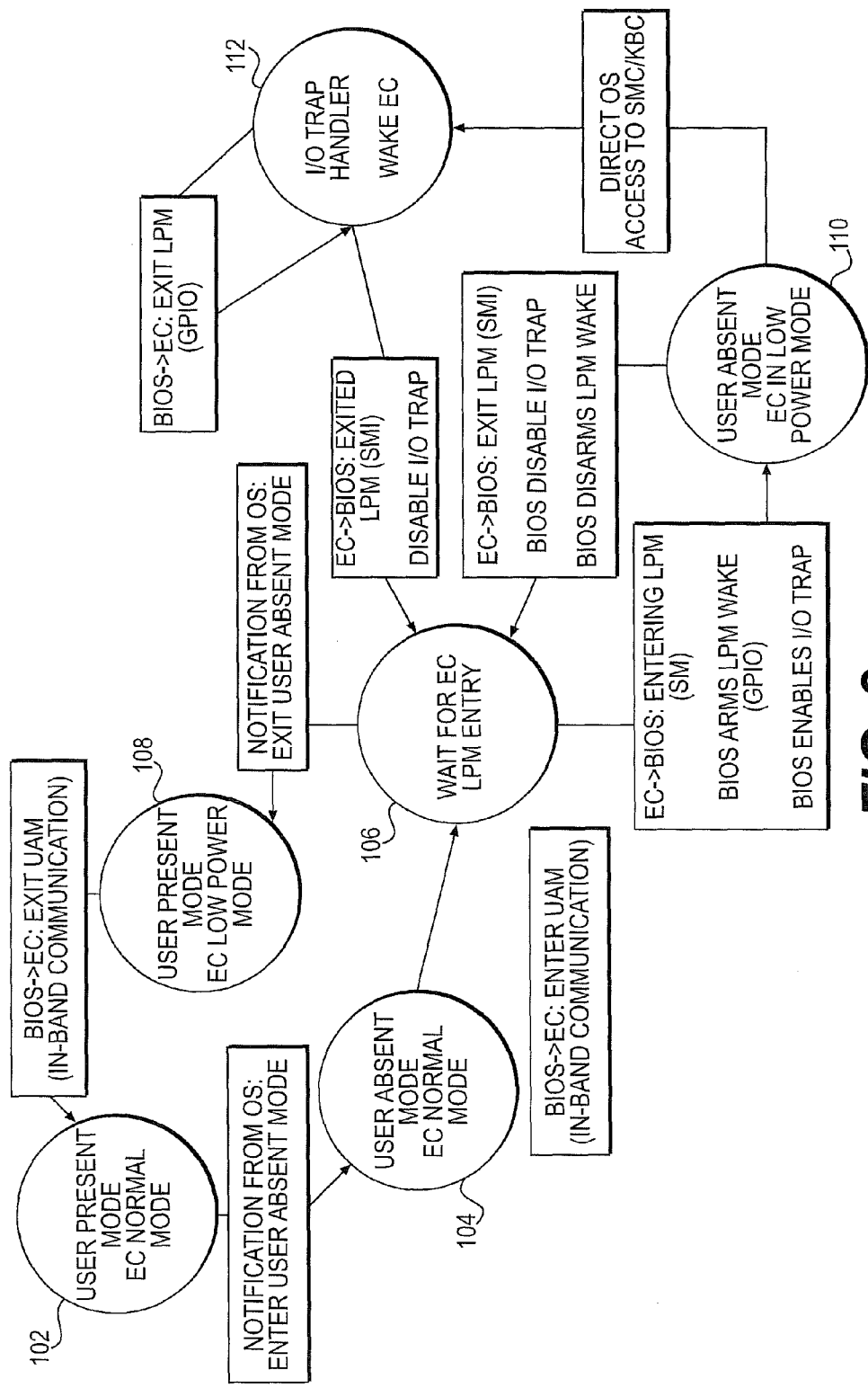
FIG. 2 is a state diagram showing logical states, transition paths and events in between different states according to an example embodiment.

FIG. 2 is a state diagram showing logical states, transition paths and events in between different states according to an example embodiment. Other embodiments and configurations may also be provided.

FIG. 2 shows different modes or states of the electronic device, such as a User Present mode, a User Absent mode (UAM), an EC Normal mode, and an EC Low Power mode (LPM).

The OS domain may include the user present mode and the user absent mode (UAM). The EC domain may include the normal mode and the low power mode (LPM).

More specifically, in state 102, the electronic device may be in a user present mode and an EC normal mode. This state may be provided when a user is using the device/system and/or the keyboard. In response to a notification from the OS, the electronic device may enter the user absent mode (UAM). As one example, the notification may be made when a display is turned off. State 104 shows the electronic device in a user absent mode (UAM) and an EC normal mode.

In response to the BIOS sending an instruction to the EC to enter the user absent mode (UAM), then in state 106, the electronic device wait for the EC to enter the low power mode (LPM). In response to a notification from the OS while in state 106, the electronic device may exit the user absent mode and then be provided in state 108, in which the OS is in a user present mode and an EC low power mode. State 108 is a pseudo-state showing a combination of states between the OS and the EC. In this state, the OS is not in the user absent mode (UAM), but the command to the EC to bring it out of the low power mode (LPM) has not yet been processed. This may be considered only a state in the BIOS state machine, such as box 212 in FIG. 5.

In state 108 as well as state 106, the EC mode is in the low power mode (LPM), but the I/O interface is active. In state 110 and state 112, the EC mode is in low power mode (LPM) and the I/O interface is off (or inactive).

Figure 4:
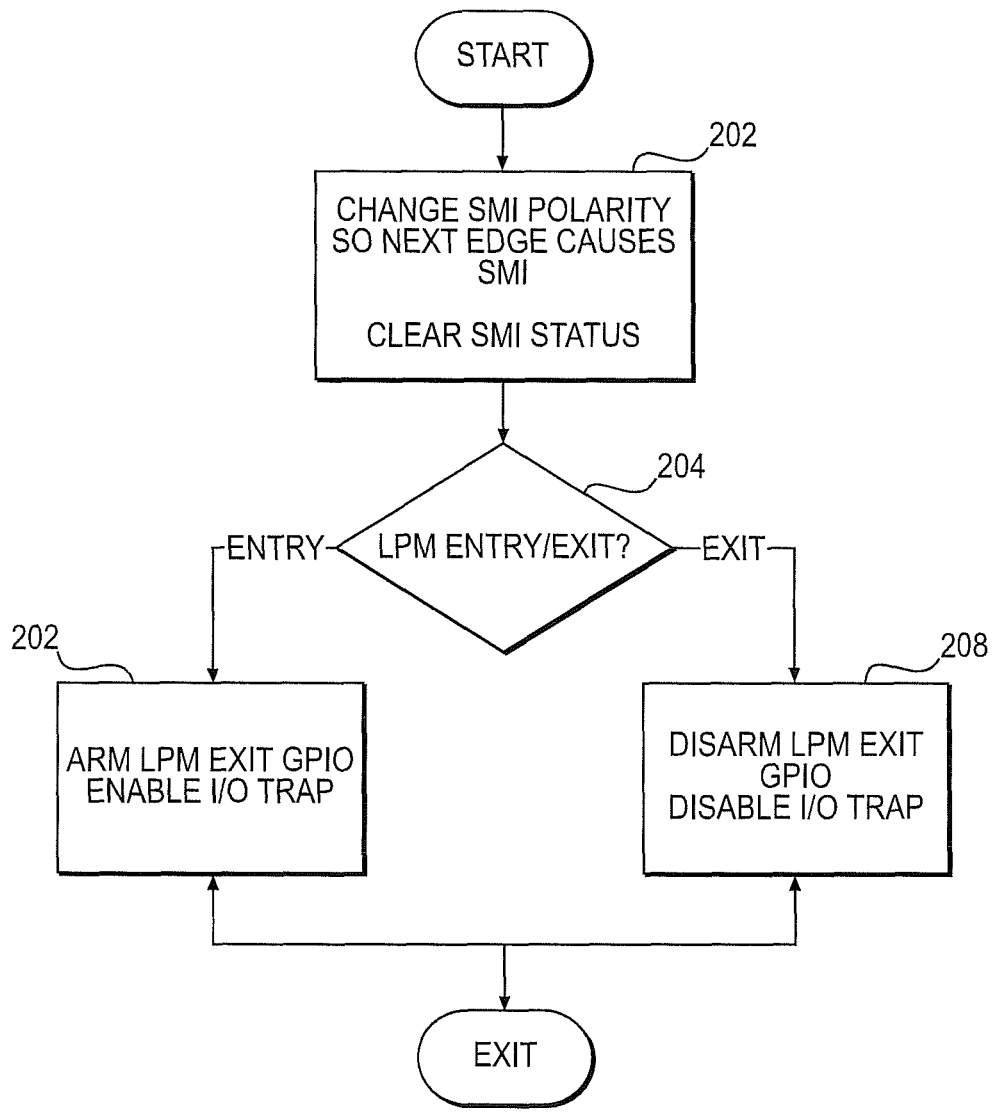
FIG. 4 is a flowchart showing operations of a handler invoked by a change in state of a signal driven by an EC according to an example embodiment.

While in state 108, the BIOS may send a command to the EC to exit the user absent mode (UAM), and then the electronic device may return to the state 102. On the other hand, while the electronic device is in state 106, the EC may instruct the BIOS that the EC has entered the low power mode (LPM), the BIOS may arm the LPM wake (or I/O wake), and the BIOS may enable an I/O trap. For example, FIG. 4 shows that the I/O Trap is only armed when needed. The I/O trap may cause the BIOS to act as a proxy for the EC when it's in the low power mode (LPM). This may prevent the OS from being in the loop when not needed (i.e., when the EC is not in the low power mode (LPM) and can service OS requests directly).

The electronic device may then be provided in state 110 in which the electronic device is in a user absent mode (UAM) and the EC is the lower power mode (LPM).

While in state 110 (a user absent mode (UAM) and EC in a low power mode (LPM)), a direct OS access to the system management controller (SMC)/keyboard system controller (KSC) may result in the electronic device being provided in state 112, in which an I/O trap handler and the EC is woken up. A normal access to the EC may cause the I/O controller to return an EC error condition to the OS. By intercepting the request from the OS, the BIOS may instead request the OS to retry the access. Once the EC data interface (i.e., an I/O interface) is active, the BIOS may remove itself from the path and allow the EC accesses to complete normally.

While in state 112, the EC may send an instruction to the BIOS to exit the low power mode (LPM) (using the EXTSMI signal on the signal line 30) and disable the I/O trap. As a result, the electronic device may then return to state 106.

Alternatively, while in state 112, the BIOS may send instructions to the EC to exit the low power mode (LPM) (using the I/O wake signal on the signal line 40).

In other situation, while in state 110, the EC may instruct the BIOS to exit the LPM (using the EXTSMI signal on the signal line 30), the BIOS may disable the I/O trap and the BIOS may disarm the LPM wake (or I/O wake). As a result, the electronic device may then return to the state 106.

Figure 3:
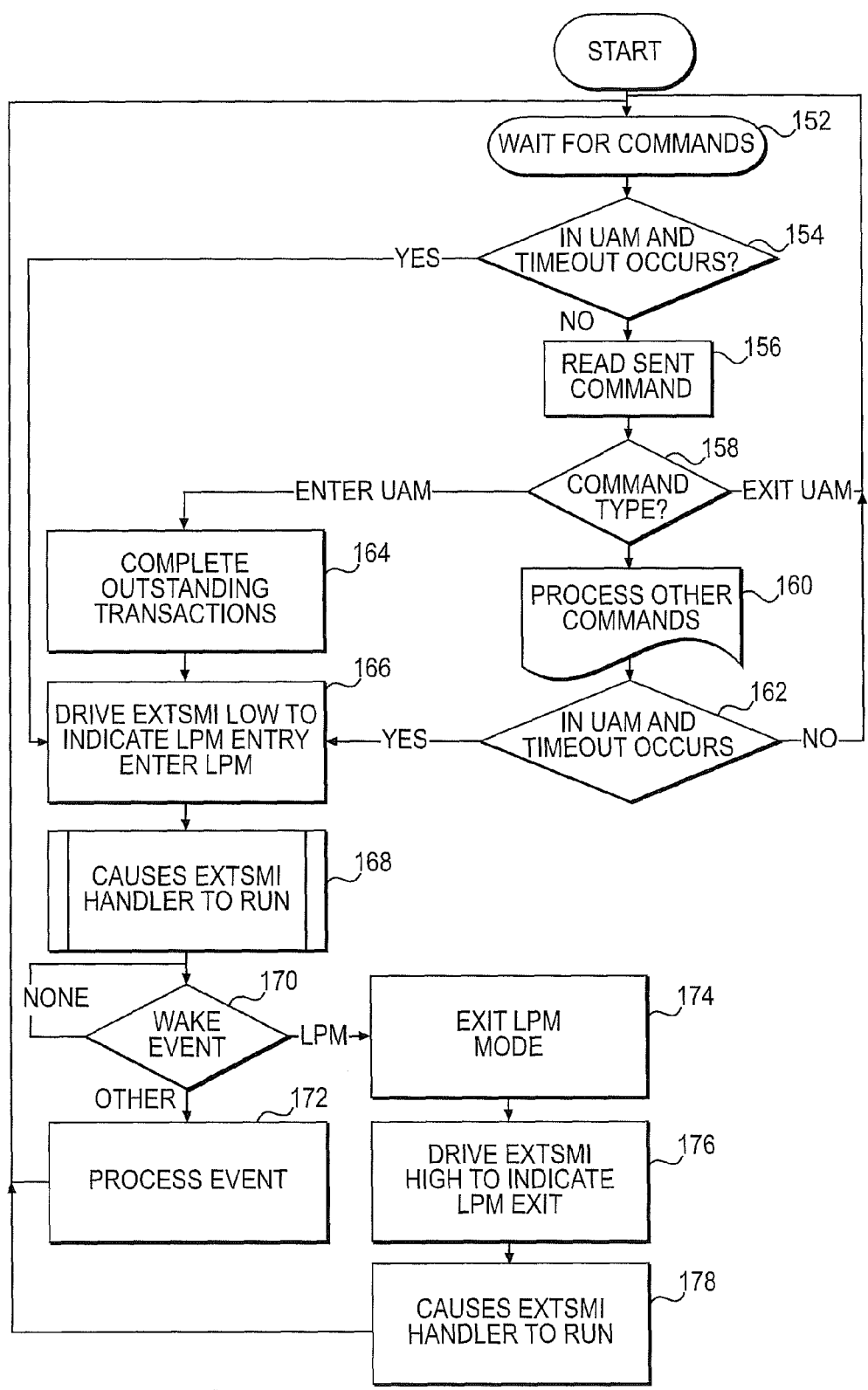
FIG. 3 is a flowchart showing operations for handling events that occur when transitioning from one state to another state according to an example embodiment.

FIG. 3 is a flowchart showing operations for handling events that occur when transitioning from one state to another state according to an example embodiment. Other operations, orders of operations and embodiments may also be provided.

The operations shown in FIG. 3 relate to operations of the EC 10.

After an initial start, in operation 152, the EC may wait for commands from the host as well as monitor other subsystems and generate any necessary alerts back to the host (normal EC operation).

In operation 154, while in a user absent mode (UAM) a determination may be made whether a timeout occurs. If the determination is NO in operation 154, then the EC may read the sent command in operation 156. In operation 158, a determination may be made of a type of command.

If the determination is YES in operation 154, then the process may proceed to operation 166.

If the command type is not a user absent mode (UAM) command in operation 158, then the EC may process other commands in operation 160, and then the EC may make a determination in operation 162. If the determination is YES in operation 162, then the process may continue to operation 166. If the determination is NO in operation 162, then the process may continue to operation 152.

If the determination of the command is an enter user absent mode (UAM) command in operation 158, then the process proceeds to operation 164, where the EC may complete outstanding transactions. If the determination of the command is an exit user absent mode (UAM) command in operation 158, then the process proceeds to operation 152.

In operation 166, the EC may drive the signal line 30 (signal EXTSMI) to a low state to indicate a low power mode (LPM) entry, and the EC may then enter the low power mode (LPM).

In operation 168, the EC may instruct the EXTSMI handler to run.

In operation 170, the EC may make a determination of a wake event.

If the determination of operation 170 is a low power mode (LPM) wake event, then in operation 174, the EC may exit the lower power mode (LPM) mode. In operation 176, the EC may drive the signal line 30 (the signal EXTSMI) to a high state to indicate a low power mode (LPM) exit. Then in operation 178, the EC may cause the EXTSMI handler to run. The process may then return to operation 152.

If the determination of operation 170 is "other", then in operation 172, the EC may process the wake event. The process may then return to operation 152.

FIG. 4 is a flowchart showing operations of a BIOS SMI handler invoked by a change in state of the EXTSMI signal (on the signal line 30) driven by the EC according to an example embodiment. Other operations and embodiments may also be provided.

This flowchart may describe the event handler within the BIOS that is used to enable/disable the I/O trap of access to the EC based on the state of the EC's I/O interface.

After an initial start, in operation 202, a system management interrupt (SMI) polarity may change so a next edge may cause a SMI, and a SMI status may be cleared.

In operation 204, a determination may be made whether the EXTSMI is a LPM Entry or an LPM exit. If the determination is that the EXTSMI is an LPM entry in operation 204, then the process may proceed to operation 206. If the determination is that the EXTSMI is an LPM exit in operation 206, then the process may proceed to operation 206.

In operation 206, the LPM exit GPIO entry may be armed, and an I/O trap may be enabled. This may enable the BIOS to intercept accesses to the EC from the OS, as well as making I/O controller configuration changes to detect notifications from the EC that the I/O interface is active (or on).

In operation 208, the LPM exit GPIO may be disarmed, and an I/O trap may be disabled. This may allow the BIOS to disable the hardware within the I/O controller that causes System Management Mode (SMM) entry upon EC accesses, as well as making I/O controller configuration changes to detect notifications from the EC that the I/O interface is inactive (or off).

Figure 5:
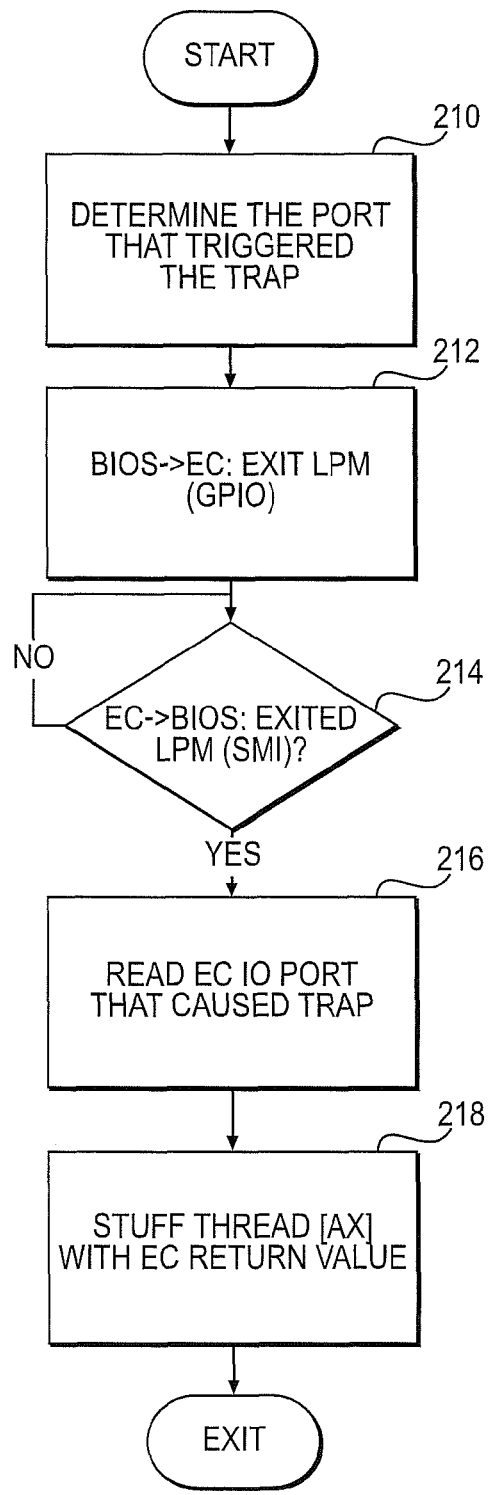
FIG. 5 is a flowchart showing operations of a handler that is invoked by operating system (OS) accesses to an EC according to an example embodiment.

FIG. 5 is a flowchart showing a BIOS SMI handler that is invoked by OS accesses to the EC according to an example embodiment. Other operations, orders of operations and embodiments may also be provided.

This flowchart describes the event handler within the BIOS that may be used to detect OS EC accesses, and may be used to request the EC to bring the I/O interface back to the active state.

In operation 210, a determination may be made of a port that triggered the I/O trap. In operation 212, the BIOS may instruct the EC to bring its data interface (i.e., the I/O interface) to the active state using the signal line 40 (the signal I/O wake)

In operation 214, the BIOS waits for the EC to inform the BIOS that it has brought its data interface (i.e., the I/O interface) to the active state using the signal line 30 (the signal EXTSMI)

If the determination is Yes in operation 214, then in operation 216, the EC IO port that caused the trap is read by the BIOS.

In operation 218, the BIOS may set up the processor (or CPU) to return the value of the EC port with EC return value. This may allow the OS to read the correct value from the EC, but masking the error condition that would have been observed by the OS had the EC's data interface (i.e., the IO interface) been inactive when the read access occurred.

The above operations relate to when the EC is in the low power mode (LPM), the BIOS "traps" on OS accesses to the EC ports, such as a Keyboard Controller status port (I/O port 64 h) and the System Management Controller status port (I/O port 66 h).

In at least one embodiment, a computer-readable medium may store a program for controlling circuitry to perform the above described operations. The program may be stored in a system memory, which for example, may be internal or external to the electronic device. In at least one embodiment, the program may be part of a control algorithm for controlling operations of the embedded controller and/or the I/O controller.

Instructions or code executed by the embedded controller or the I/O controller may be provided to a memory from a machine-readable medium, or an external storage device accessible via a remote connection (e.g. over a network via an antenna and/or network interface) providing access to one or more electronically-accessible media, etc. A machine-readable medium may include any mechanism that provides (i.e., stores and/or transmits) information in a form readable by a machine (e.g., a computer). For example, a machine-readable medium may include a random access memory (RAM), read-only memory (ROM), magnetic or optical storage medium, flash memory devices, electrical, optical, acoustical or other form of propagated signals (e.g., carrier waves, infrared signals, digital signals), etc. In alternative embodiments, hard-wired circuitry may be used in place of or in combination with the instructions or code, and thus the embodiments are not limited to any specific combination of hardware circuitry and software instructions.

The program may include code or instructions to perform any of the operations or functions performed in embodiments previously discussed above.

Elements of the above described embodiments may be provided in code segments or instructions to perform tasks. The code segments or tasks may be stored in a processor readable medium or transmitted by a computing data signal in a carrier wave over a transmission medium or communication link. The processor readable medium, machine readable medium or computer readable medium may include any medium that can store or transfer information. Examples of the processor readable medium, machine readable medium or computer readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc. The code segments or instructions may be downloaded via computer networks such as the Internet, Intranet, etc.

The following examples pertain to further embodiments.

Example 1 is an electronic device comprising: a first controller, a second controller, a data bus to couple between the first controller and the second controller, a first signal line to couple the first controller to the second controller, and the first controller to provide a first signal on the first signal line to the second controller to wake up the second controller from a low power mode.

In Example 2, the subject matter of Example 1 can optionally include that the second controller to change a state of an interface to the data bus based on the first signal from the first controller.

In Example 3, the subject matter of Example 1 and Example 2 can optionally include that the interface to be off when the second controller is in the low power mode, and the interface to be on when the second controller is in a normal mode.

In Example 4, the subject matter of Example 1 can optionally include that the first controller is an input/output controller.

In Example 5, the subject matter of Example 1 can optionally include that the second controller is an embedded controller.

In Example 6, the subject matter of Example 1 and Example 5 can optionally include that the embedded controller to implement at least one of a keyboard system controller and a system management controller.

In Example 7, the subject matter of Example 1 and Example 6 can optionally include that the second controller to receive a wake event based on an operation that involves the keyboard system controller or the system management controller.

In Example 8, the subject matter of Example 1 can optionally include that the first signal on the first signal line to cause the second controller to exit the low power mode.

In Example 9, the subject matter of Example 1 can optionally include a second signal line to couple the first controller to the second controller, wherein the second controller to provide a second signal on the second signal line to the first controller, the second signal to provide an instruction to enter the low power mode.

In Example 10, the subject matter of Example 1 and Example 9 can optionally include that a state of the second signal to indicate a status of the data bus.

In Example 11, the subject matter of Example 1 and Example 9 can optionally include that the second controller to provide a third signal on the second signal line to the first controller, the third signal to provide an instruction to exit the low power mode.

In Example 12, the subject matter of Example 1 and Example 11 can optionally include that a state of the third signal to indicate a status of the data bus.

In Example 13, the subject matter of Example 1 can optionally include that the data bus is a low pin count bus.

Example 14 is an apparatus comprising: first logic, at least a portion of which is hardware, to provide a first operation, second logic, at least a portion of which is hardware, to provide a second operation, a data bus to couple to the first logic and to the second logic, a first signal line to couple to the first logic and to the second logic, and the first logic to provide a first signal on the first signal line to the second logic to wake up the second logic from a low power mode.

In Example 15, the subject matter of Example 14 can optionally include that the second logic to change a state of an interface to the data bus based on the first signal from the first logic.

In Example 16, the subject matter of Example 14 and Example 15 can optionally include that the interface to be off when the second logic is in the low power mode, and the interface to be on when the second logic is in a normal mode.

In Example 17, the subject matter of Example 14 can optionally include that the first logic to include an input/output controller.

In Example 18, the subject matter of Example 14 can optionally include that the second logic to include an embedded controller.

In Example 19, the subject matter of Example 14 can optionally include that the second logic to implement at least one of a keyboard system controller and a system management controller.

In Example 20, the subject matter of Example 14 and Example 19 can optionally include that the second logic to receive a wake event based on an operation that involves the keyboard system controller or the system management controller.

In Example 21, the subject matter of Example 14 can optionally include that the first signal on the first signal line to cause the second logic to exit the low power mode.

In Example 22, the subject matter of Example 14 can optionally include a second signal line to couple to the first logic and to the second logic, wherein the second logic to provide a second signal on the second signal line to the first logic, the second signal to provide an instruction to enter the low power mode.

In Example 23, the subject matter of Example 14 and Example 22 can optionally include that a state of the second signal to indicate a status of the data bus.

In Example 24, the subject matter of Example 14 and Example 22 can optionally include that the second logic to provide a third signal on the signal line to the first logic, the third signal to provide an instruction to exit the low power mode.

In Example 25, the subject matter of Example 14 and Example 24 can optionally include that a state of the third signal to indicate a status of the data bus.

In Example 26, the subject matter of Example 14 can optionally include that the data bus is a low pin count bus.

Example 27 is a method of operating an electronic device having a first controller and a second controller, comprising: providing the second controller in a low power mode, and providing a first signal along a first signal line from the first controller to the second controller to wake up the second controller from a low power mode.

In Example 28, the subject matter of Example 27 can optionally include changing a state of an interface to a data bus based on the first signal from the first controller.

In Example 29, the subject matter of Example 27 and Example 28 can optionally include that the interface to be off when the second controller is in the low power mode, and the interface to be on when the second controller is in a normal mode.

In Example 30, the subject matter of Example 27 can optionally include that the first controller is an input/output controller.

In Example 31, the subject matter of Example 27 can optionally include that the second controller is an embedded controller.

In Example 32, the subject matter of Example 27 and Example 31 can optionally include that the embedded controller to implement at least one of a keyboard system controller and a system management controller.

In Example 33, the subject matter of Example 27 and Example 32 can optionally include receiving a wake event at the second controller based on an operation that includes the keyboard system controller or the system management controller.

In Example 34, the subject matter of Example 27 can optionally include that the first signal on the first signal line to cause the second controller to exit the low power mode.

In Example 35, the subject matter of Example 27 and Example 34 can optionally include providing a second signal on the second signal line from the second controller to the first controller, the second signal to provide an instruction to enter the low power mode.

In Example 36, the subject matter of Example 27 and Example 35 can optionally include that a state of the second signal to indicate a status of the data bus.

In Example 37, the subject matter of Example 27 and Example 35 can optionally include providing a third signal on the second signal line from the second controller to the first controller, the third signal to provide an instruction to exit the low power mode.

In Example 38, the subject matter of Example 27 and Example 35 can optionally include that a state of the third signal to indicate a status of the data bus.

In Example 39, the subject matter of Example 27 can optionally include that the data bus is a low pin count bus.

Example 40 is a machine-readable medium comprising one or more instructions that when executed on a first controller or a second controller to perform one or more operations to: provide the second controller in a low power mode, and provide a first signal along a first signal line from the first controller to the second controller to wake up the second controller from a low power mode.

In Example 41, the subject matter of Example 40 can optionally include that the one or more operations to further include to change a state of an interface to a data bus based on the first signal from the first controller.

In Example 42, the subject matter of Example 40 and Example 41 can optionally include that the interface to be off when the second controller is in the low power mode, and the interface to be on when the second controller is in a normal mode.

In Example 43, the subject matter of Example 40 can optionally include that the first controller is an input/output controller.

In Example 44, the subject matter of Example 40 can optionally include that the second controller is an embedded controller.

In Example 45, the subject matter of Example 40 and Example 44 can optionally include that the embedded controller to implement at least one of a keyboard system controller and a system management controller.

In Example 46, the subject matter of Example 40 and Example 45 can optionally include that the one or more operations to further include to receive a wake event at the second controller based on an operation that includes the keyboard system controller or the system management controller.

In Example 47, the subject matter of Example 40 can optionally include that the first signal on the first signal line to cause the second controller to exit the low power mode.

In Example 48, the subject matter of Example 40 and Example 47 can optionally include that the one or more operations to further include to provide a second signal on the second signal line from the second controller to the first controller, the second signal to provide an instruction to enter the low power mode.

In Example 49, the subject matter of Example 40 and Example 48 can optionally include that a state of the second signal to indicate a status of the data bus.

In Example 50, the subject matter of Example 40 and Example 48 can optionally include that the one or more operations to further include to provide a third signal on the second signal line from the second controller to the first controller, the third signal to provide an instruction to exit the low power mode.

In Example 51, the subject matter of Example 40 and Example 50 can optionally include that a state of the third signal to indicate a status of the low pin count bus.

In Example 52, the subject matter of Example 40 can optionally include that the data bus is a low pin count bus.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a first controller;
a second controller;
a data bus to couple between the first controller and the second controller, the data bus including a plurality of data bus lines between the first controller and the second controller;
a first signal line to couple between the first controller and the second controller, and the first controller to provide a first signal on the first signal line to the second controller to wake up the second controller from a low power mode, wherein the second controller to change a state of an interface to the data bus based on the first signal from the first controller, wherein the interface to be off when the second controller is in the low power mode, and the interface to be on when the second controller is in a normal mode; and a second signal line to couple between the first controller and the second controller, wherein the second signal line is a different signal line than the first signal line, wherein the second controller to provide a second signal on the second signal line to the first controller, the second signal to provide an instruction to enter the low power mode, wherein the second controller to provide a third signal on the second signal line to the first controller, the third signal to provide an instruction to exit the low power mode.

2. The electronic device of claim 1, wherein the first controller is an input/output controller.

3. The electronic device of claim 1, wherein the second controller is an embedded controller.

4. The electronic device of claim 3, wherein the embedded controller to implement at least one of a keyboard system controller and a system management controller.

5. The electronic device of claim 4, wherein the second controller to receive a wake event based on an operation that involves the keyboard system controller or the system management controller.

6. The electronic device of claim 1, wherein the first signal on the first signal line to cause the second controller to exit the low power mode.

7. The electronic device of claim 1, wherein a state of the second signal to indicate a status of the data bus.

8. The electronic device of claim 1, wherein a state of the third signal to indicate a status of the data bus.

9. The electronic device of claim 1, wherein the data bus is a low pin count bus.

10. The electronic device of claim 1, wherein an operating system (OS) communicates with the second controller through the first controller.

11. The electronic device of claim 1, further comprising firmware that includes Basic Input/Output System (BIOS), and the BIOS to provide instructions to the second controller using the first signal on the first signal line between the first controller and the second controller.

12. The electronic device of claim 11, wherein the second controller to provide instructions to the BIOS using the second signal line between the second controller and the first controller such that the electronic device exits the low power device.

13. The electronic device of claim 1, wherein the second signal on the second signal line is based on a System Management Interrupt (SMI) signal from an external source.

14. The electronic device of claim 1, wherein the first signal line is a unidirectional signal line from the first controller to the second controller, and the second signal line is a unidirectional signal line from the second controller to the first controller.

15. A non-transitory machine-readable medium comprising one or more instructions that when executed on a first controller or a second controller to perform one or more operations to:

provide the second controller in a low power mode;

provide a first signal along a first signal line from the first controller to the second controller to wake up the second controller from a low power mode;

provide a second signal on a second signal line from the second controller to the first controller, the second signal to provide an instruction to enter the low power mode, wherein the second signal line between the first controller and the second controller is a different signal line than the first signal line between the first controller and the second controller;

provide a third signal on the second signal line from the second controller to the first controller, the third signal to provide an instruction to exit the low power mode; and change a state of an interface to a data bus based on the first signal from the first controller, the interface to be off when the second controller is in the low power mode, and the interface to be on when the second controller is in a normal mode.

16. The non-transitory machine-readable medium of claim 15, wherein the embedded controller to implement at least one of a keyboard system controller and a system management controller.

17. The non-transitory machine-readable medium of claim 16, wherein the one or more operations to further include to receive a wake event at the second controller based on an operation that includes the keyboard system controller or the system management controller.

18. The non-transitory machine-readable medium of claim 15, wherein the first signal on the first signal line to cause the second controller to exit the low power mode.

19. The non-transitory machine-readable medium of claim 15, wherein the first signal line is a unidirectional signal line from the first controller to the second controller, and the second signal line is a unidirectional signal line from the second controller to the first controller.

20. A method of operating an electronic device having a first controller and a second controller, comprising:

providing the second controller in a low power mode;

providing a first signal along a first signal line from the first controller to the second controller to wake up the second controller from a low power mode;

providing a second signal on a second signal line from the second controller to the first controller, the second signal to provide an instruction to enter the low power mode, wherein the second signal line between the first controller and the second controller is a different signal line than the first signal line between the first controller and the second controller;

providing a third signal on the second signal line from the second controller to the first controller, the third signal to provide an instruction to exit the low power mode; and changing a state of an interface to a data bus based on the first signal from the first controller, the interface to be off when the second controller is in the low power mode, and the interface to be on when the second controller is in a normal mode.

21. The method of claim 20, wherein the first signal on the first signal line to cause the second controller to exit the low power mode.

22. The method of claim 20, further comprising providing instructions from firmware that includes Basic Input/Output System (BIOS) to the second controller using the first signal on the first signal line between the first controller and the second controller.

23. The method of claim 22, further comprising providing instructions to the BIOS using the second signal line between the second controller and the first controller such that the electronic device exits the low power device.

24. The method of claim 20, wherein the first signal line is a unidirectional signal line from the first controller to the second controller, and the second signal line is a unidirectional signal line from the second controller to the first controller.

* * * * *